(12) United States Patent
Williams et al.

(10) Patent No.: US 8,586,652 B2
(45) Date of Patent: Nov. 19, 2013

(54) POLYESTER COMPOSITIONS FOR MOLDING CLEAR PARTS

(75) Inventors: Alisa Annette Williams, Fall Branch, TN (US); Mark Allan Treece, Jonesborough, TN (US); Ludovic Claude Robert Gardet, Chartres (FR); Gary Michael Stack, Blountville, TN (US)

(73) Assignee: Eastman Chemical Company, Kingsport, TN (US)

( * ) Notice: Subject to any disclaimer, the term of this patent is extended or adjusted under 35 U.S.C. 154(b) by 209 days.

(21) Appl. No.: 12/835,039

(22) Filed: Jul. 13, 2010

(65) Prior Publication Data

US 2011/0086212 A1    Apr. 14, 2011

Related U.S. Application Data

(60) Provisional application No. 61/250,123, filed on Oct. 9, 2009.

(51) Int. Cl.
| | |
|---|---|
| *C08G 63/16* | (2006.01) |
| *C08G 63/18* | (2006.01) |
| *C08G 63/181* | (2006.01) |
| *C08G 63/199* | (2006.01) |
| *C08G 63/183* | (2006.01) |
| *B32B 27/36* | (2006.01) |

(52) U.S. Cl.
USPC ........... 523/400; 528/272; 528/302; 528/305; 528/307; 528/308.6; 428/220

(58) Field of Classification Search
USPC .................. 523/400; 528/272, 302, 305, 307, 528/308.6; 428/220
See application file for complete search history.

(56) References Cited

U.S. PATENT DOCUMENTS

| | | | |
|---|---|---|---|
| 2,901,466 A | 8/1959 | Kibler et al. | |
| 4,256,861 A | 3/1981 | Davis et al. | |
| 4,539,390 A | 9/1985 | Jackson et al. | |
| 5,030,708 A | 7/1991 | Krutak et al. | |
| 5,102,980 A | 4/1992 | Krutak et al. | |
| 5,194,571 A | 3/1993 | Weaver et al. | |
| 5,552,512 A | 9/1996 | Sublett | |
| 5,616,404 A * | 4/1997 | Sublett .......................... | 428/221 |
| 5,633,340 A | 5/1997 | Hoffman et al. | |
| 2006/0287483 A1 * | 12/2006 | Crawford et al. ............. | 528/302 |

FOREIGN PATENT DOCUMENTS

| | | |
|---|---|---|
| DE | 1935252 A1 | 1/1971 |
| WO | 9711106 A1 | 3/1997 |

OTHER PUBLICATIONS

Adams and Stein, "Some Studies of the Crystallization of Polychlorotrifluoroethylene Copolymer Films," J. Polymer Science Part A-2, vol. 6, pp. 31-61 (1968).
Magill, J. H., "A New Method for Following Rapid Rates of Crystallization, I. Poly (hexannethylene adipamide)," Polymer, vol. 2, p. 221-233 (1961).
Notification of Transmittal of the International Search Report and the Written Opinion of the International Searching Authority, or the Declaration, dated Feb. 16, 2011 for PCT/US2010/050640.

* cited by examiner

*Primary Examiner* — Michael Pepitone
(74) *Attorney, Agent, or Firm* — Louis N. Moreno

(57) ABSTRACT

This invention relates to certain poly(1,4-cyclohexylenedimethylene terephthalate) copolyesters which are useful for the preparation of clear and tough thick wall molded parts, produced at good cycle times. The copolyesters can be molded into desired shapes such as cosmetic jars, fragrance caps, tool handles, and toothbrushes. These molded articles can have thick or thin walls and may be molded in a two shot molding process. The copolyesters also have good flow and reduced cycle times.

15 Claims, No Drawings

POLYESTER COMPOSITIONS FOR MOLDING CLEAR PARTS

CROSS-REFERENCE TO RELATED APPLICATIONS

This application claims priority to U.S. Provisional Application Ser. No. 61/250,123 filed Oct. 9, 2009, the disclosure of which is incorporated herein by reference in its entirety.

BACKGROUND OF THE INVENTION

Various polymeric materials have been widely used over the past 70 years for molding various jars, caps, tool handles, toothbrushes and other consumer products. In many of these applications the molded part must be clear, tough, impact resistant, as well as having a pleasing appearance. In order to obtain a clear part it is desirable that the polymer have a slow crystallization rate. The occurrence of crystallinity results in the formation of haze in the part. A slower crystallization rate also reduces the chance for orientation induced crystallization in the gate area. Thus, there is the potential for improved gate appearance. In addition it is desirable to use a polymeric material with good flow (low melt viscosity) to insure the ease of completely filling the part. Furthermore, it is desirable to be able to make the parts with a short cycle time in the injection molding process to maximize the efficiency with which parts can be made. One of the main factors controlling the cycle time of a polymeric material is the time it takes to cool below its glass transition temperature during the injection molding process. Thus a glass transition temperature near the injection molding process temperature is desirable to obtain a reduced cycle time.

Polyester materials such as poly(ethylene terephthalate) (PET) and poly(1,4-cyclohexylenedimethylene Terephthalate) (PCT) have many desirable properties for molded parts but these polymers crystallize readily which results in the formation of hazy parts especially in the case of thick walled parts or during a two shot molding process.

It is possible to reduce the rate of crystallization by incorporation of additional monomers into these polyesters. However, it is important to choose the composition of these copolyesters such that not only is the crystallization rate decreased but all of the other desirable features (like cooling efficiency, flow ability, resin toughness) of a molding composition discussed above are obtained.

The present invention describes copolyesters which have a very slow crystallization rate while also giving all of the other desired attributes discussed above.

BRIEF SUMMARY OF THE INVENTION

An embodiment of the present invention concerns a molded article comprising a copolyester having an acid component and a glycol component and an inherent viscosity of from about 0.5 to about 0.8 dL/g, wherein the acid component comprises repeat units from 40 to 60 mole % terephthalic acid and from 40 to 60 mole % of one or more dibasic acids selected from the group consisting of isophthalic acid, cyclohexanedicarboxylic acid, naphthalenedicarboxylic acid, diphenyldicarboxylic acid, and stilbenedicarboxylic acid; the glycol component comprises repeat units from 1,4-cyclohexanedimethanol; the total mole % of the acid component is 100 mole % and the total mole % of the glycol component is 100 mole %; the molded article is visually clear; and the molded article has a thickness of from 8 to 90 mm.

Another embodiment concerns a molded article comprising a copolyester having an acid component and a glycol component and an inherent viscosity of from about 0.5 to about 0.8 dL/g, wherein the acid component comprises repeat units from 40 to 60 mole % terephthalic acid and from 40 to 60 mole % of one or more dibasic acids selected from the group consisting of isophthalic acid, cyclohexanedicarboxylic acid, naphthalenedicarboxylic acid, diphenyldicarboxylic acid, and stilbenedicarboxylic acid; the glycol component comprises repeat units from 1,4-cyclohexanedimethanol; the total mole % of the acid component is 100 mole % and the total mole % of the glycol component is 100 mole %; the molded article is visually clear; and the molded article has a crystallization haze half-time of greater than 40 minutes.

DETAILED DESCRIPTION

It has been found that certain CHDM based copolyesters are highly suitable for molding clear, thick-walled and tough molded articles with good flow and fast cycle times. The copolyesters can be molded into desired shapes such as cosmetic jars, fragrance caps, tool handles, and toothbrushes. These molded articles can have thick or thin walls and may be molded in a two shot molding process. The copolyesters also have good flow and reduced cycle times.

In an embodiment the articles are prepared from CHDM based copolyesters containing about 40 to 60 mole % terephthalic acid and 40 to 60% of one or more additional diacids. Suitable diacids include isophthalic acid, 1,3- or 1,4 cyclohexanedicarboxylic acid, napthalenedicarboxylic acid, and/or stilbenedicarboxylic acid. When using the cyclohexanedicarboxylic acids, they may be in the cis or trans forms or as cis/trans isomer mixtures. Any of the naphthalenedicarboxylic acid isomers may be used but the, for examples the 2,6-, 2,7-, 1,4-, 1,5-isomers may be used. The lower alkyl esters such as the methyl esters may be used instead of the acids in preparing the molding compositions of this invention. In one embodiment, the CHDM based copolyester compositions contain about 45 to about 55 mole % of the above identified dibasic acids (or their esters). In addition, small amounts (up to about 10 mole %) of other supplemental aliphatic, cycloaliphatic, or aromatic dibasic acids containing 4 to about 40 carbon atoms may be incorporated into these copolyesters.

In an embodiment, the glycol portion of these copolyesters may also contain up to 20 mol % or up to 10 mol % of another glycol containing 2 to 20 carbon atoms. Examples of suitable glycols include ethylene glycol, 1,2-propanediol, 1,3-propanediol, neopentyl glycol, 1,4-butanediol, 1,5-pentanediol, 1,6-hexanediol, or p-xylene glycol. The polymers may also be modified with polyethylene glycols or polytetramethylene glycols.

In an embodiment, the copolyesters have a glycol component that comprises from about 80 to about 100 mole percent CHDM, from about 90 to about 100 mole percent CHDM, or even from about 95 to about 100 mole percent CHDM.

Amounts of less than 1.5 mole % of certain branching agents such as trimellitic anhydride, trimellitic acid, pyromellitic dianhydride, trimesic acid, hemimellitic acid, glycerol, trimethylolpropane, pentaerythritol, 1,2,4-butanetriol, 1,2,6-hexanetriol, sorbitol, 1,1,4,4-tetrakis(hydroxymethy)cyclohexane, dipentaerythritol and the like may be used.

The copolyesters of this invention can be prepared using melt phase or solid state polycondensation procedures well known in the art. They may be batch or continuous processes. Examples of these processes can be found in U.S. Pat. Nos. 5,633,340; 4,256,861; 4,539,390; and 2,901,466 and include preparation by direct condensation or by ester interchange.

For examples, the polymers of the present invention may be prepared according to the methods described in U.S. Pat. No. 2,901,466. However, the preparation of the polymers of this invention is not particularly limited to the methods described in U.S. Pat. No. 2,901,466. This patent discloses interchange reactions as well as polymerization build-up processes. Briefly, a typical procedure consists of at least two distinct stages; the first stage known as ester-interchange and the second stage referred to as polycondensation. A detailed description of this two stage process is given in U.S. Pat. No. 5,633,340.

Suitable copolyesters will have inherent viscosity (I.V.) values of about 0.5 to about 0.8 dL/g. Such values are obtained in a 60/40 phenol/tetrachlorethane solution containing 0.5 grams (g) of polymer in 100 milliliters (mL) of solution. The broader range of copolyester compositions disclosed in U.S. Pat. No. 5,633,340 disclosed an I.V. range from 0.4 to 1.1 dL/g. The narrower I.V. range of the present invention was chosen because an I.V. below 0.5 results in a molded article with poor toughness and an I.V. above 0.8 results in poor flow making the molding of the article very difficult. According to an embodiment of the present invention, the I.V. range of the copolyester is from about 0.55 to about 0.7 dL/g.

The copolyesters according to the present invention have glass transition temperatures (Tg) of at least 75° C. as determined by Differential Scanning calorimetry (DSC) and a crystallization half-time of at least 40 minutes as measured by a small angle laser light scattering technique. According to an embodiment, the copolyesters have a Tg of from about 75° C. to about 95° C. The long crystallization half-times are desirable to prevent formation of haze or opacity in the molded parts.

The technique for determining the crystallization haze half-times consists primarily in following the increase in depolarization of plane-polarized light by the polyester. The method used in this invention is primarily that shown in "A New Method for Following Rapid Rates of Crystallization", I. Poly (hexamethylene adipamide), J. H. Magill, Polymer, Vol. 2, page 221-233 (1961) with the exception that Magill uses a polarizing microscope as the source of light and light-collection lenses. In measuring the crystallization half-times of the present invention, a helium-neon laser (with a small angle light scattering technique (SALS)) was used as was shown by Adams and Stein in J. Polymer Sci. A2, Vol. 6 (1962).

Crystallization half-times are measured at the time in which the transmitted intensity is half of the maximum intensity achieved.

The method used is generally as follows:
(1) Melt the sample to remove existing crystallinity;
(2) Crystallize the sample polyester at a predetermined temperature;
(3) Record the transmitted light intensity plotted versus time;
(4) Find the time at which the transmitted intensity is half of the maximum intensity achieved.

The above procedure is repeated at different temperatures until a minimum value for the crystallization half-time can be measured. "Minimum value" refers to the lowest measurable point on a curve plotted using the temperature data and corresponding crystallization half-time data.

The term "crystallization haze half-time as measured from the melt phase" as defined herein is the procedure as describe above.

In one embodiment the molded articles according to the present invention have a crystallization haze half-time of greater than 40 minutes, greater than 80 minutes, or greater than 100 minutes. In an embodiment, the crystallization haze half time can be up to about 300 minutes.

When the molded articles of the invention have crystallization haze half-times as described, they are generally visually clear for regions of a molded article having a thickness of up to 90 mm and still maintain improved clarity and reduced haze. The molded articles can have a thickness of from about 8 mm to about 90 mm, from about 12 mm to about 60, or from about 15 mm to about 30 mm thick.

Haze in a molded object can be quantified by measuring ratio of diffuse transmittance to total light transmittance passing through the article. ASTM D 1003, Method A is a generally accepted protocol for this test using, for example, a BYK-Gardner HazeGuard Plus instrument. If crystallites are present in a molded article, this will register a significantly higher haze reading, relative to a part that is void of crystallization.

The copolyesters may be used in clear form or they may be colored or pigmented with additives or copolymerizable colorants. Typically useful copolymerizable colorants are described in U.S. Pat. Nos. 5,030,708 (1991), 5,102,980 (1992) and 5,194,571 (1993) all assigned to Eastman Kodak Company.

Other additives such as stabilizers, antioxidants, mold release agents, fillers and the like may also be used if desired. Although not preferred, polymer blends may be used.

The CHDM based copolyesters of this invention are easy to mold into desired shapes such as fragrance caps, cosmetic jars and the like. The molded articles have good toughness and good see-through clarity even in articles with thick or thin walls. Additionally, articles molded with this invention are capable of being haze (crystalline) free, even in two-shot molding processes. There is also the potential for improved gate appearance due to the lower crystallization rate of these copolyesters. Furthermore, molded articles can be made with low cycle times when using the copolyesters of this invention.

EXAMPLES

This invention can be further illustrated by the following examples of preferred embodiments thereof, although it will be understood that these examples are included merely for purposes of illustration and are not intended to limit the scope of the invention unless otherwise specifically indicated.

I. Preparation of Copolyesters

Example 1 (E1)

Copolyester E1 contained 52 mole % terephthalic acid (TPA), 48 mole % isophthalic acid (IPA) and 100 mole % CHDM. The inherent viscosity was measured to be 0.64 g L/cm$^3$. The physical properties and crystallization half times are listed in Table 1.

Example 2 (E2)

Copolyester E2 contained 50 mole % terephthalic acid, 50 mole % isophthalic acid and 100 mole % CHDM. The inherent viscosity was measured to be 0.62 g L/cm$^3$. The physical properties and crystallization half times are listed in Table 1.

Comparative Example 1 (C1)

Copolyester C1 contained 65 mole % terephthalic acid, 35 mole % isophthalic acid and 100 mole % CHDM. The inherent viscosity was measured to be 0.62 g L/cm³. The physical properties and crystallization half times are listed in Table 1.

Comparative Example 2 (C2)

Copolyester C2 contained 100 mole % terephthalic acid, 62 mole % CHDM and 38 mole % ethylene glycol (EG). The inherent viscosity was measured to be 0.70 g L/cm³. The physical properties and crystallization half times are listed in Table 1.

Comparative Example 3 (C3)

Copolyester C3 contained 100 mole % terephthalic acid, 31 mole % CHDM and 69 mole % ethylene glycol. The inherent viscosity was measured to be 0.59 g L/cm³. The physical properties and crystallization half times are listed in Table 1.

Comparative Example 4 (C4)

Copolyester C4 contained 74 mole % terephthalic acid, 26 mole % isophthalic acid and 100 mole % CHDM. The inherent viscosity was measured to be 0.72 g L/cm³.

Comparative Example 5 (C5)

Copolyester C5 contained 100 mole % terephthalic acid, 62 mole % CHDM and 38 mole % ethylene glycol (EG). The inherent viscosity was measured to be 0.62 g L/cm³.

II. Property Characterization

Analytical Analysis:

The example and comparative example copolyester materials are characterized using the following analytical techniques:

The inherent viscosity (IV) of the polyesters was determined in 60/40 (wt/wt) phenol/tetrachloroethane at a concentration of 0.5 g/100 ml at 25° C.

The composition of the neat resins was determined by proton nuclear magnetic resonance spectroscopy (NMR).

The glass transition (Tg) temperatures were measured using a TA Instruments differential scanning calorimeter (DSC) at a scan rate of 20° C./min.

The density of the resin is measured using ASTM D 792.

It is well known to those in the art that amorphous copolyester will exhibit faster cooling times in a mold when it has a low density and high Tg. The lower density promotes more efficient cooling, whereas a higher Tg enables the sample to solidify and freeze off more quickly in a mold. Consequently, in certain embodiments is preferred that the molded articles of this invention exhibit a density less than 1.25 g/cm³ and a Tg greater than 80° C. This effectively reduces the cooling and over-all cycle time of a molding process.

Physical Property Analysis:

For the physical property measurements, ASTM tests bars were molded on a Toyo 90 injection molding machine. The pellets were first dried at 70° C. for 3-6 hours. The molding melt temperature was approximately 260° C. and the mold temperature was 30° C.

The mechanical properties of all copolyester resins were characterized using the following methods:

Heat deflection temperature, at 264 psi, was determined according to ASTM D648.

Flexural modulus and flexural strength were determined according to ASTM D790.

Tensile properties (break strength, break elongation) were determined according to ASTM D638.

Notched Izod impact strengths were determined according to ASTM D 256, at temperatures of 23° C. for 0.125" thick tensile bars.

In an embodiment, the molded articles of the present invention exhibit tough performance, with a break elongation greater than 100%.

Crystallization Rate Analysis:

The crystallization half-times were determined using the small angle light scattering (SALS) technique, discussed previously. In this method, a helium-neon laser is used to measure the time at which the intensity of transmitted light drops to half of the maximum intensity achieved. The sample is first melted (280° C.) to remove all preexisting crystallinity. Then, the sample is rapidly cooled to a predetermined temperature (Tc) and the transmitted light intensity is recorded as a function of time. The time at which the light intensity drops to half the original value denotes the crystallization half-time reported. All samples exhibit their fastest crystallization rate in the 140-180° C. window. But for comparison purposes, the temperature at which the crystallization rate is the highest in this range was chosen (shortest half-time in the temperature range).

In an embodiment, the copolyesters of the present invention have a crystallization half-time of greater than 100 minutes. The longer the half-time, the more versatility exists to mold clear parts, without a crystalline haze.

When the molded articles of the invention have crystallization haze half-times as described, they are typically clear for parts 8 to 90 mm thick.

According to the present invention, haze in a final molded object is measured according to ASTM D 1003, Method A, and is calculated as a percentage, from the ratio of diffuse transmittance to total light transmittance. A BYK-Gardner HazeGuard Plus was used to measure haze. Because of the highly curved nature, variable thickness, and textured surface of many of the articles according to the present invention, the absolute haze measurements are not comparable between two molded objects of unique or different shapes. Instead, a relative comparison between similarly shaped objects is used to quantitatively show the features of the invention. This is done by normalizing all of the haze measurements for a given object, by the haze recorded for a similarly shaped object according to the invention on that same part. This produces a unitless quantity, referenced in the text as: Haze Level. Hence, a Haze Level of 1 (±0.1) implies that no crystalline-induced haze was detected in the light transmittance analysis. A value greater than 1 (±0.1) implies that light scattering crystallites are present in the final object.

Flow Analysis:

The flowability of each example and comparative example resin was measured using small amplitude oscillatory shear (SAOS) rheology, conducted with RDA II from Rheometrics Scientific. A frequency sweep from 1 to 400 rad/s, was performed at 260° C., using a 10% strain value. All of the resin examples exhibit a Newtonian-like plateau in the 1-10 rad/s shear rate regime. Consequently, the viscosity measured at 1 rad/s is considered representative of the zero-shear viscosity (ZSV). The ZSV is indicative of the resin's ability to flow easily in a melt process, with a lower value implying the resin is less complicated to fill and mold a part without incurring visual defects or machine limitations.

In an embodiment, the copolyesters used in the invention have a ZSV (at 260° C.) less than 7000 Poise (P), less than 5000 P, of even less than 3000 P. This ensures that the part can be appropriately filled and molded, with minimal defects such as gate blush, flow lines, record grooving, or other visual defects. Furthermore, a copolyester exhibiting flow behavior within the range shown by this invention decreases the filling pressures required, which enables processing on less robust equipment.

Table 1 reports the results for the property characterization of each example (E1-E2) and comparative example (C1-C5) of the invention:

crystallize in parts that are thicker than 5-8 mm, based on its extremely short crystallization half-time (5 min). Furthermore, C4 does not exhibit optimal flow characteristics, having a high viscosity of 5640 P at 260° C., 1 rad/s.

Comparative example, C5, displays excellent toughness, but poor flow, and longer cycle times (due to a higher density than E1-E2). Furthermore, the crystallization half-time (18 min) lends itself to producing hazy parts at thicknesses<13-17 mm.

TABLE 1

| Copolyester Nomenclature | UNITS | E1 | E2 | C1 | C2 | C3 | C4 | C5 |
|---|---|---|---|---|---|---|---|---|
| Copolyester Composition | | | | | | | | |
| CHDM | mol % | 100 | 100 | 100 | 62 | 31 | 100 | 62 |
| EG | mol % | X | X | X | 38 | 69 | X | 38 |
| IPA | mol % | 48 | 50 | 35 | X | X | 26 | X |
| TPA | mol % | 52 | 50 | 65 | 100 | 100 | 84 | 100 |
| Copolyester Properties | | | | | | | | |
| Density | g/cm3 | 1.20 | 1.20 | 1.20 | 1.23 | 1.28 | 1.20 | 1.23 |
| Inherent Viscosity | dL/g | 0.64 | 0.62 | 0.62 | 0.70 | 0.59 | 0.72 | 0.62 |
| DSC Second Cycle Tg | ° C. | 84 | 84 | 85 | 85 | 78 | 87 | 81 |
| Crystallization Half Time | min | 128 | 168 | 15 | 33 | >1500 | 5 | 18 |
| Zero shear viscosity @ 260° C. | Poise | 2750 | 2030 | 2450 | 9590 | 2810 | 5640 | 3690 |
| Heat Deflection Temperature 264 Psi | (° C.) | 63 | 64 | 65 | 64 | 62 | 65 | 67 |
| Tensile Strength @ Yield | MPa | 50 | 52 | 50 | 43 | 51 | 46 | 47 |
| Tensile Break Elongation | % | 193 | 104 | 290 | 330 | 33 | 310 | 260 |
| Flexural Modulus | MPa | 1814 | 1952 | 2041 | 1793 | 2007 | 1900 | 1900 |
| Unnotched Izod Impact Strength | J/m | NB | NB | NB | NB | NB | NB | NB |

To summarize the data presented in Table 1, Table 2 is provided to show that the examples of this invention uniquely combine the important characteristics of a copolyester resin for filling (flow) and molding a clear (slow crystallization), tough parts at good cycle times (low density and high Tg). All of the comparative examples lack one or more required feature to straightforwardly mold an article.

For instance, copolyester C1 has good toughness, flow ability and will produce the best cycle time based upon the measured density and Tg. However, this comparative example crystallizes quickly and will produce haze in parts greater than 8-12 mm thick. On the contrary, both examples of this invention (E1-2) exhibit good cycle time and flow, while also having the ability to mold clear (crystalline haze-free) articles, as thick as 60-80 mm.

Comparative example, C2, crystallizes slowly enough to make haze-free parts as thick as 18-22 mm thick. However, it flows poorly based on the measured ZSV, which makes parts extremely difficult to fill without encountering visual defects or machine limitations. Processing the resin at higher temperatures can improve the flow, but this will have a negative effect on cooling cycle times. Furthermore, the higher density (1.23 g/cm³), relative to the examples of this invention, can reduce cooling efficiency and cycle times.

Comparative example C3, exhibits good flow and should not crystallize in parts of up to 90 mm thick. However, this copolyester is extraordinarily brittle, leading to breakages around the gate during molding or failures in the final part performance. Additionally, the Tg of this material is significantly lower than the examples of this invention, which significantly increases the cooling time (and cycle time) required for producing the article.

Comparative example, C4, is a tough material, and should produce an acceptable copolyester cycle time (based on density and Tg being comparable to E1-E2). However, it will

TABLE 2

| | E1 | E2 | C1 | C2 | C3 | C4 | C5 |
|---|---|---|---|---|---|---|---|
| Flow (zero shear viscosity <3000 P) | x | x | x | | x | | |
| Toughness (break elongation >100%) | x | x | x | x | | x | x |
| Slow Crystallization (clear, haze-free parts) (half-time >60 min) | x | x | | | x | | |
| Fast Cycle Time (low density, high Tg, low molding temperature) | x | x | x | | | x | |

The data in Tables 1-2 have shown that the examples of this invention possess a unique combination of properties (viscosity, crystallization rate, toughness, density, Tg) for successfully molding a thick walled article with a copolyester composition which has good clarity. The following experiments detail the performance of the examples (E1-E2) and comparative examples (C1-C5) in an actual molding process for forming an article acceptable for use in the consumer market:

II. Preparation of Molded Articles

Experiment 1:

E1 and C1-3 were injection molded at Alcan Packaging (Parigne, France) to form a part designed for consumer use in the fragrance and cosmetics packaging market. The part is an over molded, two-shot fragrance cap, with the first shot weighing 112 grams (20 mm thick), and the complete part weighing 186 g (31 mm thick). Two cavities were used to match the clamping force available on the machine (200 Metric Tons (MT); Krauss Maffei). All materials were dried (70° C. for 2-6 hours) prior to molding.

E1 and C1 were processed at 225° C. melt temperature, whereas C2 and C3 were processed at 250° and 240° C., respectively. Mold temperatures were kept at 25-30° C., whereas the core of the part was held at 5-10° C. for all resins. Note that the differences in operating temperatures are a result of process optimization that is used to reduce visual defects (i.e. flow lines, shrink marks, record grooves, air bubbles, voids, etc.) attributable to the subtle viscosity and cooling rate differences of each specific resin.

Table 3 indicates the performance of each tested material in molding the fragrance cap. The example of this invention, E1, showed no haze in the first shot or final part, indicating that the crystallization half-time is long enough to allow the part to sufficiently cool before crystallites can nucleate and scatter light. Furthermore, as shown on Table 3, E1 exhibited a 60 second cooling time, which is faster than C2-C3 and comparable to C1. Thus, in certain embodiments, the molded objects according to the present invention have the features of being haze free and cooling efficient.

The first shot of C1 showed obvious crystalline haze. Consequently, the second shot overmold was not even attempted. Notice that this result was unsurprising (since the first shot is 20 mm thick), as it agrees with the half-time data (Table 1) predicting only parts 8-12 mm thick will be haze free. Consequently, C1 is not an acceptable copolyester for molding this article because of crystalline induced haze.

The comparative example, C2, showed no haze after the first shot. This again agrees with the half-time data indicating a part 18-22 mm thick can be haze free. However, when the second shot was applied overtop of the first, the first shot gets reheated. Because this reheated portion of the melt is no longer in direct contact with a mold surface, a portion of the shot remains at high enough temperature (100-200° C.) to allow haze-producing crystallites to form. Furthermore, note that despite having a higher Tg than C3, the cooling time is not effected much because of having to mold this higher viscosity resin (Table 1) at hotter temperatures (250° C.). Consequently, because of having low flow, with poor cycle time and forming haze in the part, C2 is not an acceptable copolyester for molding this article.

Comparative example, C3, showed no haze at all in the final part, however, the low Tg and higher density necessitate a much longer cooling period (80 seconds for C3, compared to 60 seconds for E1, as shown in Table 3). This translates directly to a nearly 25% increase in cycle time relative to the invention, E1. Furthermore, as was discussed previously, the inferior toughness of C3 frequently causes the frozen melt in the runner system to break during part ejection. This causes a blockage in the runner system and can result in significant equipment downtime. Consequently, because of being poor in toughness and prone to lengthy cooling times, C3 is not an acceptable copolyester for molding this part.

In summary, this experiment shows that the invention (E1) can show combined characteristics of slow crystallization, efficient cooling, and toughness to produce a thick, tough, and clear molded article at good cycle times. C1-3 fail in this application for the reasons discussed.

TABLE 3

| Material | Crystalline Haze in Part? | | | | Shot 1 Cooling Time (s) |
|---|---|---|---|---|---|
| | Shot 1 | Haze Level | Final Part | Haze Level | |
| E1 | No | 1 | No | 1 | 60 |
| C1 | Yes | 1.75 | N/A | | 60 |
| C2 | No | 1 | Yes | 1.58 | 80 |
| C3 | No | | No | | 80 |

Experiment 2:

E1, C1, and C2 were molded at Lombardi Designs & Manufacturing (Freeport, N.Y.) to form a part designed for consumer use in the fragrance and cosmetics packaging market. The part is a single shot thick walled fragrance cap weighing 59 grams. The thickest wall section was measured to be approximately 12 mm. The single cavity prototype tool was equipped with a three plate mold and 1.3 mm gate. All materials were dried appropriately (70° C. for 4 hours) prior to molding.

All materials were processed at 260° C., by using a ramped temperature profile from feed (248° C.) to metering (260° C.). Mold temperatures were maintained at 32° C., whereas the core was held at 24° C. Typically, adjustments to operating temperatures of each material would be required to eliminate visual defects (i.e. flow lines, shrink marks, record grooves, air bubbles, voids, etc.), however, the tooling was not optimized for copolyesters and perfect parts were not obtainable. No attempt was made to optimize cooling time.

Table 4 indicates the performance of each tested material in molding the fragrance cap. The example of this invention, E1, showed no haze in the final part indicating that the crystallization half-time was long enough to allow the part to cool before crystallization occurs. Furthermore, E1 exhibited acceptable gate aesthetics (lack of splay, blush, flow lines, crystalline rings, etc.) confirming its flow behavior is conducive to making parts using small gates. This illustrates that certain embodiments of the invention have the features of being haze free and good flow ability for obtaining a clear, aesthetically pleasing part.

The comparative example, C1, showed hazing in the final part when processed at the same conditions. This agrees with the half-time data (Table 1), predicting that this material may show haze at thicknesses of 12 mm or greater. Furthermore, C1 exhibited comparable gate aesthetics to E1 although the overall part aesthetics were worse than E1. C1 is an unacceptable copolyester for this application due to crystalline induced haze visible in the molded article.

The comparative example, C2, showed no haze in the final part. However, the flow characteristics (high ZSV, see Table 1) of this material render it difficult to flow through small gates. As a consequence of poor flow, the molded article exhibits both sink marks and gate blush. C2 is an unacceptable copolyester for the molding of this part.

In summary, the experiment shows that certain embodiments of the invention (E1) have the combined characteristics of slow crystallization and good flow behavior to produce a thick, clear part in a single shot with good aesthetics. C1 and C2 fail in this application for the reasons discussed.

TABLE 4

| Material | Is final part free of crystalline haze? | Haze Level | Is final part free of visible flow defects? |
|---|---|---|---|
| E1 | Yes | 1 | Yes |
| C1 | No | 1.54 | Yes |
| C2 | Yes | 1 | No |

Experiment 3

E1, C1, C2, C4, and C5 were molded at Eastman Chemical Company into screw driver handles in a two cavity test mold. The handles weigh 79 grams and are molded in a single shot. The thickest wall section is measured to be approximately 25.4 mm. All materials were dried at approximately 70° C. for 6 hours prior to molding. All materials were processed with a maximum barrel temperature of 260° C. and a mold temperature of approximately 25° C.

The screwdriver handles molded with E1 and C2 showed no obvious crystalline haze, while a significant amount of visual haze was present in the handles molded from C1, C4 and C5. In contrast to the complex geometry of the cosmetic containers described in previous examples, these screwdriver handles contained flat sections through which meaningful haze measurements could be obtained. The haze values for these screwdriver handles measured by ASTM D 1003, Method A, are summarized in Table 5. A haze level of about 20% is seen in the E1 and C2 handles, despite having no visually obvious crystalline haze. This value can be interpreted as a baseline haze level, larger than normal due to the extreme thickness of these parts. As the thickness of a part increases the transmittance of light through it is reduced by scattering and results in an increase in the calculated haze. The haze values obtained for the screwdriver handles molded from C1, C4 and C5 all showed measurements close to 100%, the maximum possible value which represents a fully opaque part (0% Transmittance).

The significantly lower haze values for E1 and C2 compared to C1, C4, and C5 supports the visual observations that these were the only two materials able to mold screwdriver handles without the formation of crystalline haze. Although C2 is capable of making a haze free thick part, it is not a suitable molding material as described by this invention due to its significantly higher inherent viscosity. This higher inherent viscosity results in a large zero shear viscosity as shown in Table 1 and consequently a copolyester with relatively poor flow. Thus this material will have difficulty in filling complex parts without producing visual defects. If an attempt is made to improve the flow of C2 by reducing its inherent viscosity, then its crystallization rate will be increased (shorter crystallization half-times) thereby reducing its ability to mold thick parts which are haze free. This effect is demonstrated by copolyester C5, which has the same composition as C2 but an inherent viscosity which is comparable to E1. In this case, the C5 materials makes screw driver handles with significant crystalline haze as shown in Table 5.

TABLE 5

| Material | IV (dL/g) | Haze (%) |
|---|---|---|
| E1 | 0.64 | 20 |
| C1 | 0.62 | >95 |
| C2 | 0.70 | 24 |
| C4 | 0.72 | >95 |
| C5 | 0.62 | >95 |

The invention has been described in detail with particular reference to preferred embodiments thereof, but it will be understood that variations and modifications can be effected within the spirit and scope of the invention.

We claim:

1. A molded article comprising a copolyester having an acid component and a glycol component and an inherent viscosity of from about 0.5 to about 0.8 dL/g,
wherein the acid component comprises repeat units from 40 to less than about 55 mole % terephthalic acid and from greater than about 45 to 60 mole % of one or more dibasic acids selected from the group consisting of isophthalic acid, diphenyldicarboxylic acid, and stilbenedicarboxylic acid;
the glycol component comprises repeat units from 1,4-cyclohexanedimethanol;
the total mole % of the acid component is 100 mole % and the total mole % of the glycol component is 100 mole %;
the molded article is visually clear;
the molded article has a thickness of from 8 to 90 mm; and
the molded article has a shortest crystallization haze half-time as determined between 140° C. and 180° C. of greater than 100 minutes.

2. The molded article of claim 1 wherein the acid component comprises repeat units of 45 to less than about 55 mole % terephthalic acid.

3. The molded article of claim 1, wherein the acid component comprises up to 10 mole % of supplemental dibasic acids.

4. The molded article of claim 3 wherein the supplemental dibasic acids are selected from one or more of the group consisting of aliphatic, cycloaliphatic, or aromatic dibasic acids containing 4 to about 40 carbon atoms.

5. The molded article of claim 1 wherein the glycol component comprises from about 80 to about 100 mole % 1,4-cyclohexanedimethanol.

6. The molded article of claim 5 wherein the glycol component comprises from about 90 to about 100 mole % 1,4-cyclohexanedimethanol.

7. The molded article of claim 6 wherein the glycol component comprises from about 95 to about 100 mole % 1,4-cyclohexanedimethanol.

8. The molded article of claim 5 wherein the glycol component contains up to 20 mole % of one or more additional glycols containing 2 to 20 carbons.

9. The molded article of claim 8 wherein the one or more additional glycols is selected from the group consisting of ethylene glycol, 1,2-propanediol, 1,3-propanediol, neopentyl glycol, 1,4-butanediol, 1,5-pentanediol, 1,6-hexanediol, and p-xylene glycol.

10. The molded article of claim 9 wherein the one or more additional glycols comprises ethylene glycol.

11. The molded article of claim 1 which is visually clear for portions of the article having a thickness of from about 12 to about 60 mm.

12. The molded article of claim 11 which is visually clear for portions of the article having a thickness of from about 15 to about 30 mm.

13. The molded article of claim 1, wherein the article is a cosmetic jar, a fragrance cap, a tool handle, or a toothbrush.

14. The molded article of claim 1, wherein the article is prepared via a two shot molding process.

15. A molded article comprising a copolyester having an acid component and a glycol component and an inherent viscosity of from about 0.5 to about 0.8 dL/g,
wherein the acid component comprises repeat units from 40 to less than about 55 mole % terephthalic acid and from greater than about 45 to 60 mole % of one or more dibasic acids selected from the group consisting of isophthalic acid, diphenyldicarboxylic acid, and stilbenedicarboxylic acid;
the glycol component comprises repeat units from 1,4-cyclohexanedimethanol;
the total mole % of the acid component is 100 mole % and the total mole % of the glycol component is 100 mole %;
the molded article is visually clear;
the molded article has a thickness of from 8 to 90 mm; and
the molded article has a shortest crystallization haze half-time as determined between 140° C. and 180° C. of greater than 40 minutes.

* * * * *